(12) United States Patent
Netzer et al.

(10) Patent No.: US 9,539,898 B2
(45) Date of Patent: Jan. 10, 2017

(54) FILLER HEAD

(71) Applicant: Veritas AG, Gelnhausen (DE)

(72) Inventors: Heribert Netzer, Hanau (DE); Michael Groβ, Reichelsheim (DE)

(73) Assignee: VERITAS AG, Gelnhausen (DE)

( * ) Notice: Subject to any disclaimer, the term of this patent is extended or adjusted under 35 U.S.C. 154(b) by 0 days.

(21) Appl. No.: 14/147,806

(22) Filed: Jan. 6, 2014

(65) Prior Publication Data

US 2014/0190981 A1    Jul. 10, 2014

(30) Foreign Application Priority Data

Jan. 7, 2013  (DE) ......................... 10 2013 100 076

(51) Int. Cl.

| | |
|---|---|
| *B60K 15/077* | (2006.01) |
| *B60K 15/04* | (2006.01) |
| *B60K 15/035* | (2006.01) |
| *B60K 15/03* | (2006.01) |

(52) U.S. Cl.
CPC ............. *B60K 15/077* (2013.01); *B60K 15/04* (2013.01); *B60K 2015/03394* (2013.01); *B60K 2015/03538* (2013.01); *B60K 2015/03552* (2013.01); *B60K 2015/0458* (2013.01); *F01N 2610/1413* (2013.01)

(58) Field of Classification Search
CPC .................................................. B60K 15/077
USPC ....... 141/285, 289, 290, 297, 298, 299, 300, 141/311 R, 312, 348, 349, 350, 351, 352, 141/356, 363, 367, 369, 370, 372, 390; 220/4.14, 220/86.2, 86.4, 746
See application file for complete search history.

(56) References Cited

U.S. PATENT DOCUMENTS

| | | | | |
|---|---|---|---|---|
| 2,843,161 | A * | 7/1958  | Ward ............................ | 141/290 |
| 3,830,267 | A * | 8/1974  | Cass ............................. | 141/287 |
| 4,651,889 | A * | 3/1987  | Uranishi et al. ............. | 220/86.2 |
| 4,701,198 | A * | 10/1987 | Uranishi et al. ................ | 96/148 |
| 4,706,708 | A * | 11/1987 | Fornuto et al. ............... | 137/588 |
| 4,714,172 | A * | 12/1987 | Morris ......................... | 220/86.2 |
| 4,730,652 | A * | 3/1988  | Bartholomew .............. | 141/302 |
| 4,747,508 | A * | 5/1988  | Sherwood .................... | 220/86.2 |
| 4,765,504 | A * | 8/1988  | Sherwood et al. .......... | 220/86.2 |
| 4,809,863 | A * | 3/1989  | Woodcock et al. .......... | 220/746 |
| 4,816,045 | A * | 3/1989  | Szlaga et al. ................... | 96/164 |

(Continued)

FOREIGN PATENT DOCUMENTS

| | | |
|---|---|---|
| DE | 6930524 | 4/1970 |
| DE | 4202643 | 8/1993 |

(Continued)

OTHER PUBLICATIONS

International Search Report dated Mar. 11, 2014 issued on Application No. EP 20130191493.9, European Patent Office.

*Primary Examiner* — Timothy L Maust
*Assistant Examiner* — Andrew Schmid
(74) *Attorney, Agent, or Firm* — Mannava & Kang, P.C.; Arash Behravesh

(57) ABSTRACT

The present invention relates to a filler head (100) for a liquid tank in a motor vehicle with a housing (103), with a first molded housing part (103-1) having formed therein a tank vent pipe (105) for introducing air into the housing (103); and a second molded housing part (103-2) having formed therein a dip tube (107) for guiding a jet of liquid in the interior of the filler head (100), the dip tube (107) including a vent opening (111) for discharging from the filler head (100) the air that may be introduced through the tank vent pipe (105).

13 Claims, 5 Drawing Sheets

(56) References Cited

U.S. PATENT DOCUMENTS

| | | | |
|---|---|---|---|
| 4,836,835 A * | 6/1989 | Harris et al. | 96/113 |
| 4,917,157 A * | 4/1990 | Gifford et al. | 141/59 |
| 4,941,587 A * | 7/1990 | Terada | 220/86.2 |
| 4,944,779 A * | 7/1990 | Szlaga et al. | 96/109 |
| 4,955,950 A * | 9/1990 | Seiichi et al. | 141/46 |
| 5,103,877 A * | 4/1992 | Sherwood et al. | 141/59 |
| 5,320,147 A * | 6/1994 | Jamrog | 141/312 |
| 5,327,946 A * | 7/1994 | Perkins | 141/59 |
| 5,437,317 A * | 8/1995 | Takatsuka et al. | 141/312 |
| 5,485,871 A * | 1/1996 | Romanek et al. | 141/312 |
| 5,503,199 A * | 4/1996 | Whitley et al. | 141/312 |
| 5,507,324 A * | 4/1996 | Whitley et al. | 141/59 |
| 5,538,055 A * | 7/1996 | Kunz et al. | 141/312 |
| 5,606,954 A | 3/1997 | Yamazaki et al. | |
| 5,713,401 A * | 2/1998 | Weeks | 141/59 |
| 5,730,194 A * | 3/1998 | Foltz | 141/301 |
| 5,791,387 A * | 8/1998 | Palvolgyi | 141/348 |
| 5,921,424 A * | 7/1999 | Palvolgyi | 220/86.2 |
| 6,230,739 B1 * | 5/2001 | Gericke | 137/588 |
| 6,367,520 B1 * | 4/2002 | Palvolgyi et al. | 141/289 |
| 6,669,043 B2 * | 12/2003 | Fish et al. | 220/4.14 |
| 6,874,550 B2 * | 4/2005 | Brooker | 141/299 |
| 6,880,593 B1 * | 4/2005 | Swane | 141/286 |
| 7,694,665 B2 | 4/2010 | Ehrman et al. | |
| 8,220,508 B2 * | 7/2012 | Rongstock | 141/372 |
| 8,651,151 B2 * | 2/2014 | Berghorst et al. | 141/350 |
| 8,746,298 B2 * | 6/2014 | Gerdes | 141/350 |
| 2004/0239010 A1 | 12/2004 | Miura et al. | |
| 2005/0155671 A1 * | 7/2005 | McClung et al. | 141/350 |
| 2006/0096662 A1 * | 5/2006 | King et al. | 141/367 |
| 2007/0108211 A1 * | 5/2007 | Zhu | 220/367.1 |
| 2007/0169845 A1 * | 7/2007 | Benjey et al. | 141/350 |
| 2009/0084464 A1 | 4/2009 | Hagano | |
| 2009/0107583 A1 * | 4/2009 | Benjey | 141/350 |
| 2010/0224284 A1 * | 9/2010 | Kolberg et al. | 141/325 |
| 2011/0315682 A1 * | 12/2011 | Tsiberidis | 220/86.2 |
| 2013/0206757 A1 * | 8/2013 | Nagai et al. | 220/86.2 |
| 2013/0306665 A1 | 11/2013 | Eberhardt et al. | |
| 2014/0190981 A1 * | 7/2014 | Netzer et al. | 220/746 |

FOREIGN PATENT DOCUMENTS

| | | |
|---|---|---|
| DE | 20 2008 001 586 U1 | 6/2008 |
| DE | 102011009745 | 8/2012 |
| EP | 0 636 505 A1 | 2/1995 |
| JP | 2009 113 657 A | 5/2009 |

\* cited by examiner

FILLER HEAD

CROSS REFERENCE

This Application claims the benefit of DE 10 2013 100 076.2 filed on Jan. 7, 2013, which is incorporated herein by reference in its entirety.

TECHNICAL FIELD

The present invention relates to a filler head for a liquid tank in a motor vehicle.

BACKGROUND

During filling of a liquid tank in a vehicle, liquid may escape from a filler head and contaminate the vehicle exterior or the environment. An escape of liquid should therefore be avoided. During filling of a liquid tank (SCR tank) with an aqueous solution of urea, it is additionally necessary to fill the liquid tank with the filling systems available on site at a filling rate of up to 40 l/min, while avoiding an escape of liquid. In this case, an escape of liquid should also be prevented during refilling, and filling with a screwed-on refill bottle (Kruse bottle) or an adapter for a 5l canister should be possible.

Document DE 10 2011 009 745 A1 describes in this context a filler neck for an auxiliary liquid reservoir for a motor vehicle.

The object underlying the invention is to provide an improved filler head with which an escape of liquid during filling or refilling can be prevented efficiently even at high filling rates.

This object is achieved by the subject matter having the features according to the independent claim. Advantageous embodiments of the invention are subject-matter of the figures, the description and the dependent claims.

SUMMARY OF THE INVENTION

According to an aspect of the invention, the object is solved by a filler head for a liquid tank in a motor vehicle with a housing, with a first molded housing part having formed therein a tank vent pipe for introducing air into the housing; and a second molded housing part having formed therein a dip tube for guiding a jet of liquid in the interior of the filler head, the dip tube including a vent opening for discharging from the filler head the air that has been introduced or may be introduced through the tank vent pipe. The vent opening is for example a vent hole. The liquid is for example an aqueous solution of urea.

The filler head allows high filling rates of the liquid tank, without any escape of liquid taking place. In contrast to the use of an annular gap, the vent opening arranged in the dip tube offers the advantage that the filler head can be oriented such that the vent opening is located at the highest point in the interior of the filler head. Even if liquid should enter the filler head and accumulate in the lower areas of the filler head, an escape of this liquid can be prevented for as long as possible.

According to an advantageous embodiment of the filler head, the vent opening of the dip tube is an opening of circular cross-section. This is technically advantageous for example insofar as the vent opening can easily be formed in the dip tube and that, through the vent opening, a turbulence-free air current is created when air is discharged.

According to a further advantageous embodiment of the filler head, the vent opening of the dip tube is arranged in the area of an upper housing wall. This is technically advantageous for example insofar as an escape of liquid, which may have accumulated in the lower area of the filler head chamber, through the vent opening is prevented.

According to a further advantageous embodiment of the filler head, the dip tube is formed in the form of a cylinder. This is technically advantageous for example insofar as a good guiding effect and a laminar or turbulence-free flow of liquid are achieved during the liquid filling process.

According to a further advantageous embodiment of the filler head, the dip tube comprises on an inner side thereof a spacer for creating a vent channel in the area of the vent opening. This is technically advantageous for example insofar as the vent opening is prevented from being closed by a filler nozzle resting on the area where the vent opening is provided.

According to a further advantageous embodiment of the filler head, the spacer is formed by a spacer rib extending in the longitudinal direction of the dip tube. This is technically advantageous for example insofar as the laminar or turbulence-free flow of liquid is not interfered with when the liquid flows through the dip tube.

According to a further advantageous embodiment of the filler head, a stop for a filler nozzle is formed in the spacer rib. This is technically advantageous for example insofar as the filler nozzle can only be introduced up to a predetermined position in the interior of the filler head and the outlet of the filler nozzle occupies a predetermined position.

According to a further advantageous embodiment of the filler head, the stop in the spacer rib is arranged below the vent opening of the dip tube. This is technically advantageous for example insofar as, during filling, the flow of air through the vent opening is increased, for example by a Venturi effect, by air flowing past the vent opening within the dip tube. Due to the flow of liquid during filling, for example a suction effect is created, which increases the flow of air through the vent opening.

According to a further advantageous embodiment of the filler head, the tank vent pipe is arranged parallel to the dip tube. This is technically advantageous for example insofar as the structural design of the filler head is particularly space-saving and laterally projecting connections are avoided.

According to a further advantageous embodiment of the filler head, the tank vent pipe is arranged in the vicinity of the vent opening of the dip tube. This is technically advantageous for example insofar as an easy and fluid dynamically short transition is achieved during venting.

According to a further advantageous embodiment of the filler head, the second molded housing part has formed therein a surge wall, which is arranged between an outlet of the tank vent pipe and the vent opening. This is technically advantageous for example insofar as a transfer of liquid into the tank vent pipe is impeded and a formation of bubbles or foam in the interior of the filler head is prevented.

According to a further advantageous embodiment of the filler head, the surge wall is arranged parallel to the longitudinal direction of the filler tube or the filler neck. This is for example again technically advantageous insofar as a turbulence-free flow of liquid will occur around the surge wall.

According to a further advantageous embodiment of the filler head, the dip tube comprises on an outer side thereof an opening for attaching a modular, annular surge element to the dip tube. This is technically advantageous for example insofar as a modular surge element can easily be mounted on the lower end of the dip tube.

According to a further advantageous embodiment of the filler head, the dip tube comprises a modular, annular surge element, which is attachable to the dip tube. This is technically advantageous for example insofar as the dip tube is modularly adapted to different lower molded housing parts by attaching thereto differently dimensioned surge elements, and a modular construction system is realized in this way.

According to a further advantageous embodiment of the filler head, the dip tube comprises on the outer side thereof longitudinal ribs for forming a stop for the attached surge element. This is technically advantageous for example insofar as the mount of the surge element is improved and forces acting on the surge element can be transmitted to the dip tube more effectively.

According to a further advantageous embodiment of the filler head, the second molded housing part comprises on an inner side thereof at least one fixing element for fixing the inserted, annular surge element. This is technically advantageous for example insofar as, when the housing is being assembled, the surge element will be fixed simultaneously.

Additional features and advantages of various embodiments will be set forth, in part, in the description that follows, and will, in part, be apparent from the description, or may be learned by the practice of various embodiments. The objectives and other advantages of various embodiments will be realized and attained by means of the elements and combinations particularly pointed out in the description herein.

Embodiments of the invention are shown in the drawings and will be described in more detail in the following.

It is to be understood that both the foregoing general description and the following detailed description are exemplary and explanatory only, and are intended to provide an explanation of various embodiments of the present teachings.

DETAILED DESCRIPTION OF THE INVENTION

Figure 1:
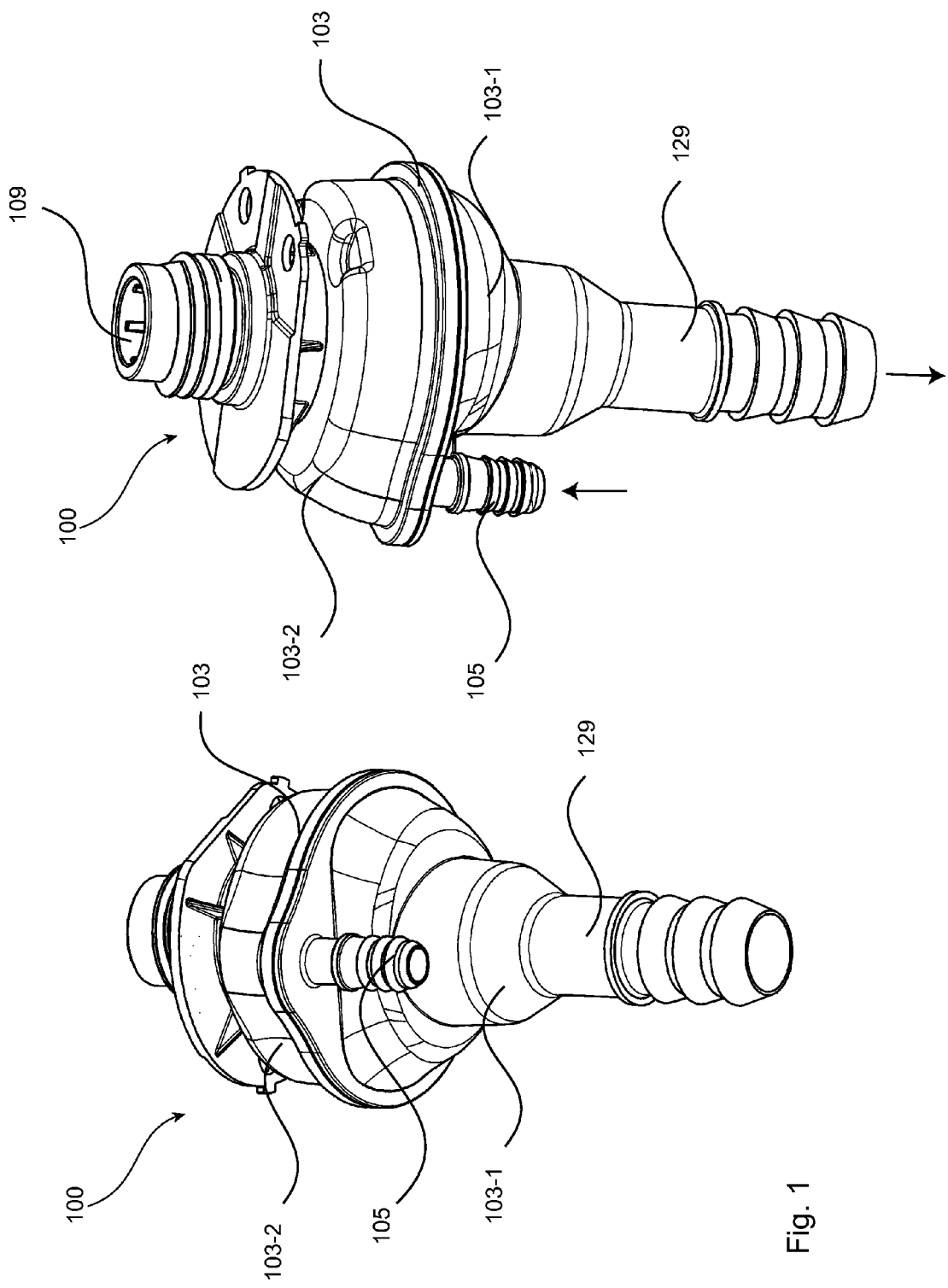
FIG. 1 shows a perspective exterior view of a filler head.

FIG. 1 shows a perspective exterior view of a filler head 100 with a housing 103 composed of a first molded housing part 103-1 and a second molded housing part 103-2. By means of the filler head 100 adequate ventilation of a bottle and of the canister during filling is guaranteed, even at high filling rates, and an escape of liquid from a filler opening 109 is prevented. Air displaced from the liquid tank is introduced into the filler head 100. The introduced air is separated from the liquid in the filler head 100 so that it will not entrain any liquid which can then exit the filler head 100 or escape therefrom in the direction of a user.

For the purpose of filling, a filler nozzle is inserted into the filler opening 109 of the filler head 100 and actuated. The liquid will then flow out of the filler nozzle via the filler head 100 and into the liquid tank, which is not shown.

In the lower molded housing part 103-1 an outlet connector 129 is formed through which, during filling, the liquid flows into the liquid tank in the direction of the liquid tank. To this end, the outlet connector 129 has attached thereto for example a hose, which is not shown, or a liquid line leading to the liquid tank. In addition, the lower molded housing part 103-1 has formed therein a tank vent pipe 105 into which air, which is displaced by the liquid in the liquid tank during filling, is introduced, so that this air can then be discharged via the filler opening 109 of the filler head 100.

For this purpose, the tank vent pipe 105 has connected thereto for example a vent hose, which is not shown. The filler opening 109 is configured such that, with the filler nozzle inserted, a vent channel is formed around the filler nozzle. This is accomplished for example by a groove profile extending circumferentially in the interior of the filler opening 109. The vent channel in the interior of the filler head 100 is configured such that, even at a liquid filling rate of 40 l/min, also air can escape through the filler head 100 at a rate of 40 l/min.

The tank vent pipe 105 extends in the same direction as the outlet connector 129 so that a space-saving installation of the filler head 100 within the vehicle is possible. Connection lines for the tank vent pipe 105 and the outlet connector 129 can then be attached from the same direction.

The molded housing parts 103-1 and 103-2 are for example plastic or injection molded parts made of polyamide (PA), polyoxymethylene (POM), polyolefin or olefin-based thermoplastic elastomers (TPO). The production of the molded housing parts 103-1 and 103-2 from these materials is particularly advantageous, since a high strength and stability of the filler head 100 is accomplished in this way.

Figure 2:
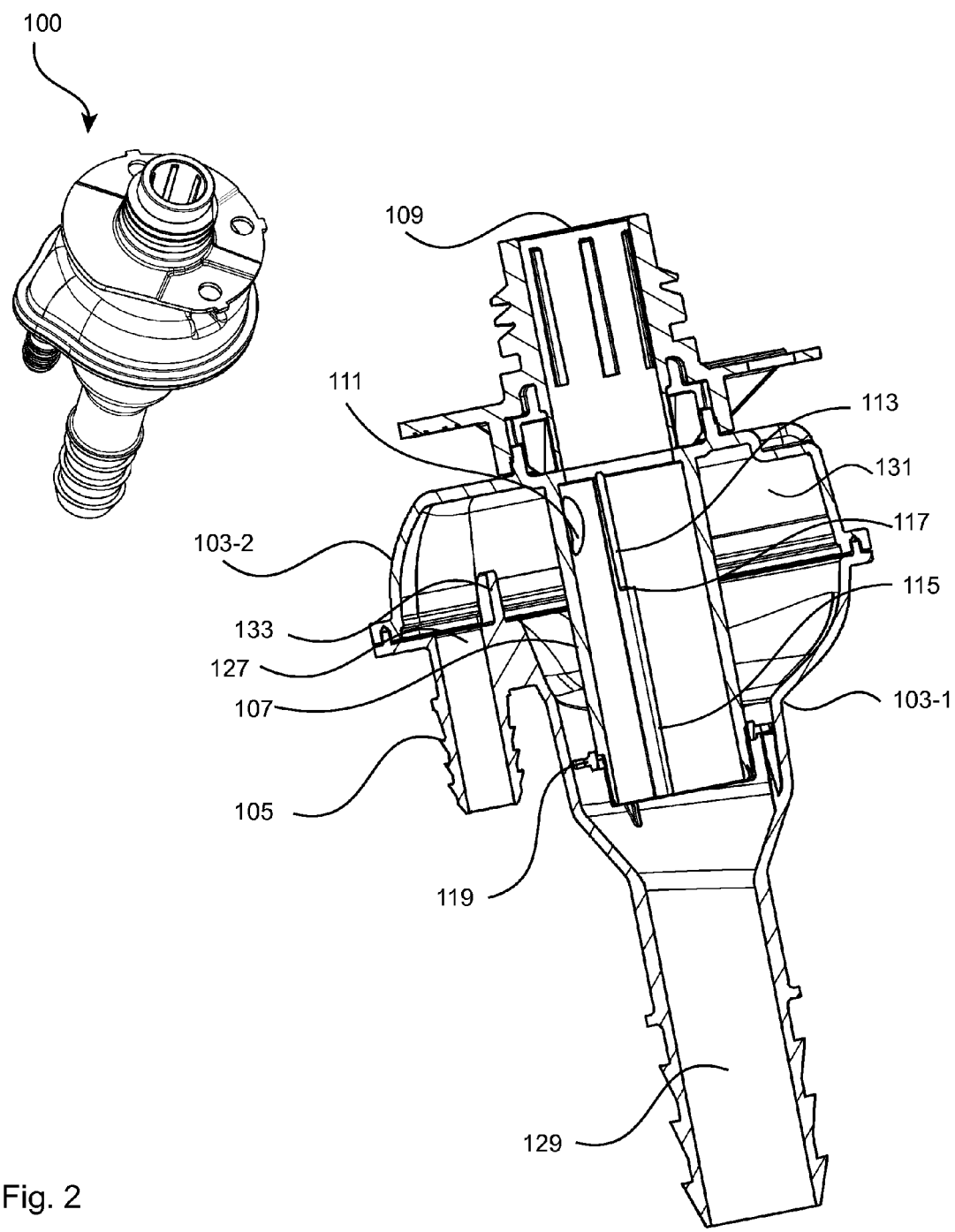
FIG. 2 shows a cross-sectional view of the filler head.

FIG. 2 shows a cross-sectional view of the filler head 100. In the upper molded housing part 103-2 a dip tube 107 is formed, which accommodates the filler nozzle, positions it and conducts the jet of the liquid introduced. The dip tube 107 has a cylindrical basic shape and projects into a filler head chamber 131 formed in the interior of the housing 103. The dip tube 107 is an integral component of the upper molded housing part 103-2.

During filling, the displaced air flows via the tank vent pipe 105 into the pressure-tight filler head chamber 131 and creates a slight excess pressure in the interior of the filler head chamber 131. This excess pressure acts as an air cushion and forces liquid, which may perhaps be contained in the filler head 100, towards the outlet connector 129. The filler neck has an internal diameter of for example 11 mm to 12 mm.

In order to allow the introduced air to escape from the filler head chamber 131, the dip tube 107 has arranged therein a vent opening 111 for discharging the air introduced through the tank vent pipe 105. The size of the vent opening 111 is chosen such that a back-up of air, which may lead to premature deactivation of the filler nozzle due to liquid entering the filler head chamber 131, and an escape of liquid from the filler head 100 are prevented. The position of the vent opening 111 is chosen such that, on the one hand, air can escape as long as possible and, on the other hand, an escape of liquid can be prevented. Hence, the position, the height and the width of the vent opening 111 match one another.

The vent opening 111 is formed for example by a circular opening in the dip tube 107, said opening having a diameter of 6 mm to 10 mm, preferably 8 mm. The vent opening 111 is formed in an upper area of the dip tube 107 in the vicinity of a housing wall or on an edge of the filler head chamber 131. Thus, liquid can rise in the filler head chamber 131, whereas the air introduced through the tank vent pipe 105 escapes through the vent opening 111 for as long as possible.

The filler head 100 can, during installation in a motor vehicle, be oriented such that the vent opening 111 is located at the highest position in the interior of the filler head 100. Even if liquid should enter the filler head 100 and accumulate in the lower regions of the filler head chamber 131, an escape of this liquid can be prevented.

On the inner side of the dip tube 107, spacers 113 are formed in the area of the vent opening 111, said spacers 113 creating between an inserted filler nozzle and the vent opening 111 a gap through which the air can escape. The spacers 113 prevent the wall of the filler nozzle from blocking the vent opening 111 and guarantee that a vent channel is formed in the interior of the dip tube. In addition, the spacers 113 guarantee that the filler nozzle inserted will be centered.

The spacers 113 are formed as spacer ribs 115 extending in the interior of the dip tube 107 in the flow or longitudinal direction. This shape of the spacers 113 leads not only to the formation of a vent channel in the area of the vent opening 111 but also to additional guidance of the flow of liquid in the interior of the dip tube 107. A creation of swirls or turbulences in the interior of the filler head 100 during filling of the liquid tank with liquid can be prevented in this way.

For positioning the filler nozzle at a predetermined position in the interior of the dip tube 107, a stop 117, which prevents the filler nozzle from sliding further down, is formed in the spacer ribs 115. The stop 117 is formed below the vent opening 111, when seen in the direction of liquid flow.

The tank vent pipe 105 extends parallel to the dip tube 107 and the outlet connector 129. The outlet 127 of the tank vent pipe 105 lies in the vicinity of the vent opening 111 formed in the dip tube 107. Thus, a short path can be realized fluid dynamically when discharging the air from the filler head chamber 131.

At the lower end of the dip tube 107, a surge element 119 is provided, which decelerates a return flow of liquid and prevents the filler head chamber 131 of the filler head 100 from being fully flooded. In addition, the surge element 119 allows the remaining space of the filler head 100 to be used for accommodating the residual amount during refilling. The surge element 119 is secured to the dip tube 107 in the filler head 100 as a separate part. It is thus possible to make an adaptation to various tank systems and to establish a modular system.

Figure 3:
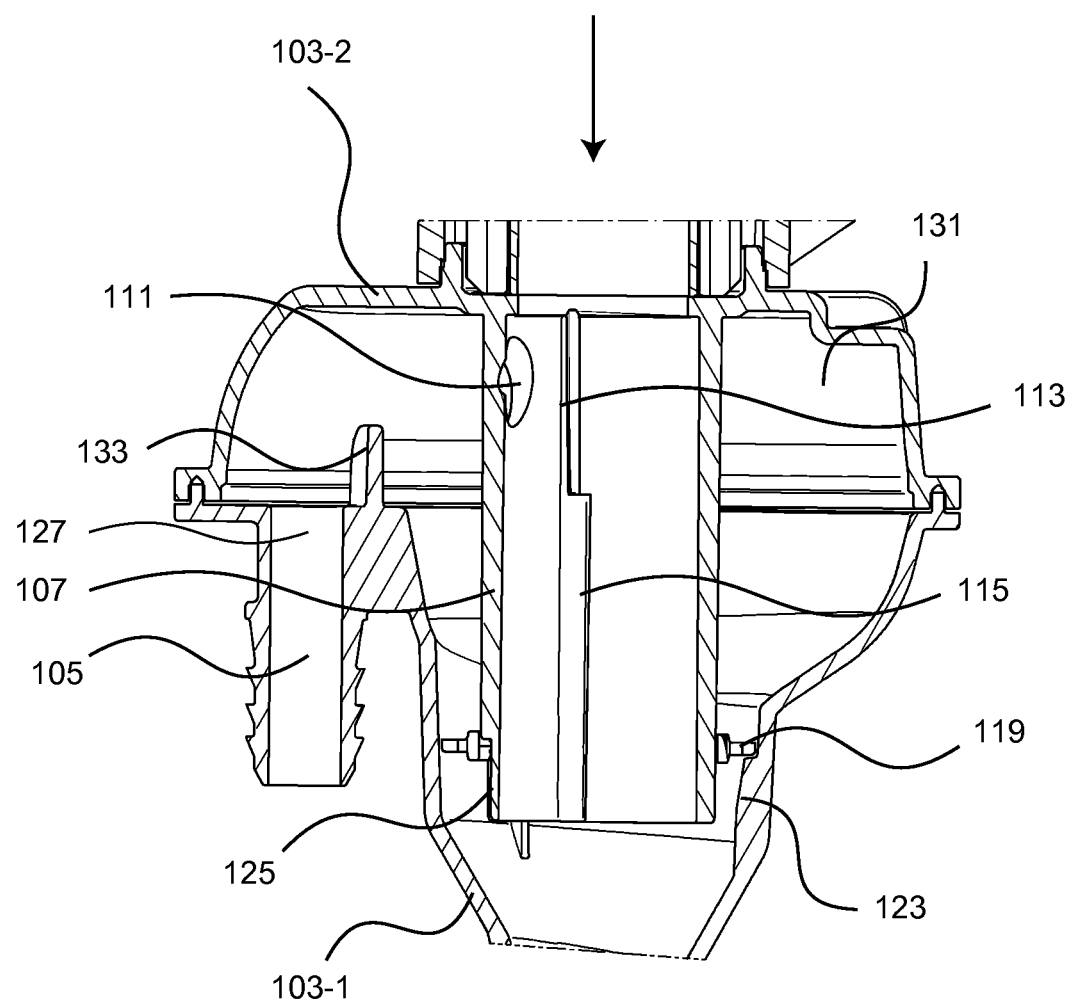
FIG. 3 shows an enlarged cross-sectional view of the filler head.

FIG. 3 shows an enlarged cross-sectional view of the filler head 100. The filler neck 105 is arranged at the same location of the filler head 100 as the vent opening 111 within the dip tube 107 so that the flow resistance occurring will be low. The position of the tank vent pipe 105 lies in the upper area of the housing 103 and is chosen as high as possible. Thus, the position of the tank vent pipe 105 is adapted to the position of the vent opening 111.

In the lower molded housing part 103-1, a fixing element 123 for fixing the inserted, annular surge element 119 is formed on the inner side of the molded housing part. During assembly of the upper molded housing part 103-2 and the lower molded housing part 103-1, the fixing element 123 abuts on the lower surface of the surge element 119, so that the surge element 119 is held in position. The fixing element 123 is an integral component of the lower molded housing part 103-1.

On the lower side of the dip tube 107 an opening 125 is formed, into which a boss of the surge element 119 is inserted. A plug-on mechanism for attaching the surge element 119 to the dip tube 107 is thus realized.

In the lower molded housing part 103-1 a surge wall 133 is additionally formed, which is arranged between the outlet 127 of the tank vent pipe 105 and the vent opening 111. The surge wall 133 extends in the direction of the filler neck 105 so that incoming air is not deflected thereby. The surge wall 133 prevents air and liquid from being mixed in the area of the tank vent pipe 105 in the filler head 100. The formation of foam and bubbles in the filler head chamber 131 will thus be suppressed.

The spacer rib 115 extends in the flow direction of the liquid in the interior of the dip tube 107 and imparts a laminar or turbulence-free flow to the flow of liquid during filling. Swirls or turbulences in the interior of the filler head 100 can be avoided in this way.

Figure 4:
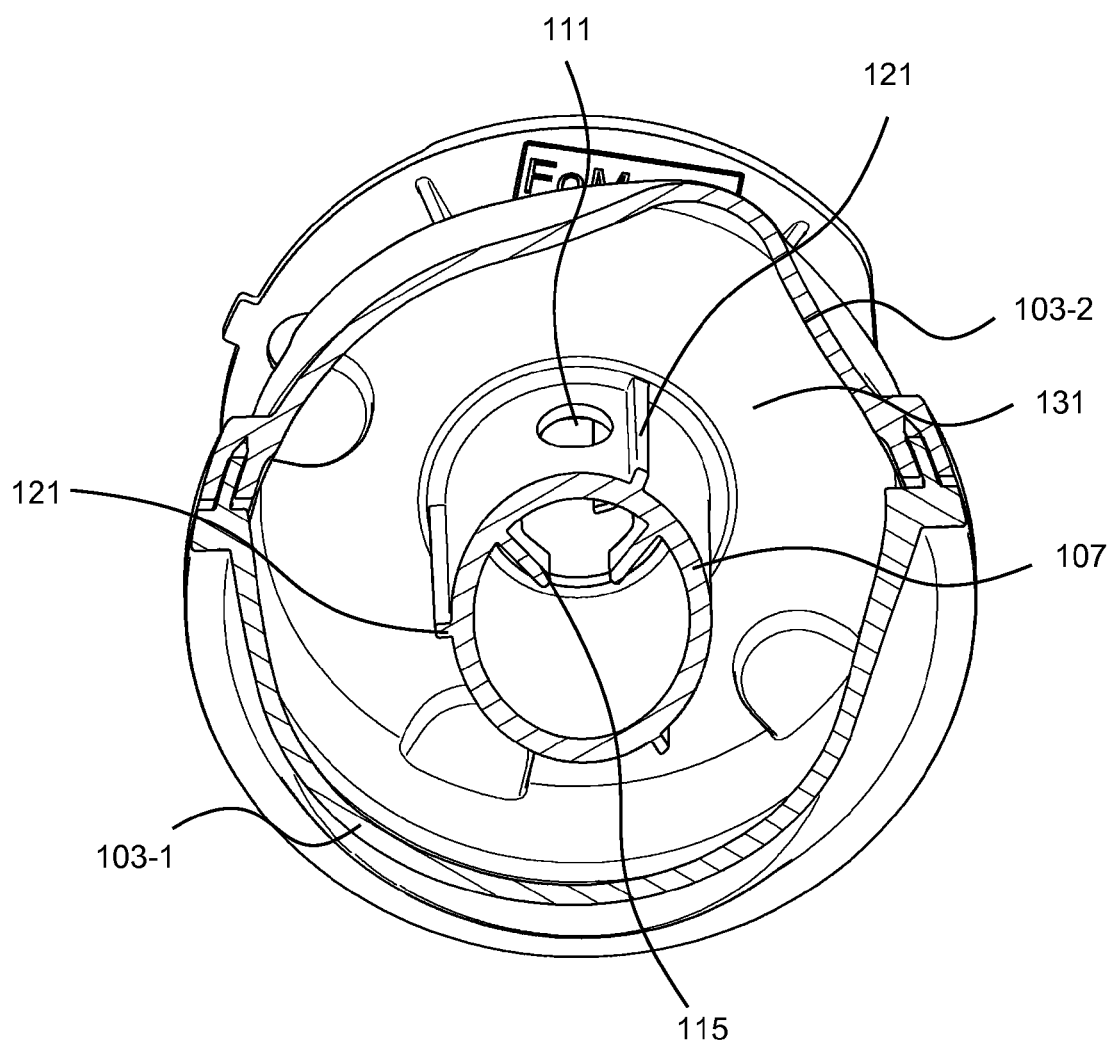
FIG. 4 shows a further cross-sectional view of the filler head.

FIG. 4 shows a further cross-sectional view of the filler head 100. The outer surface of the dip tube 107 has provided thereon three longitudinal ribs 121, which extend along the dip tube 107 and which serve as an additional stop and safety means during insertion of the surge element 119. Forces acting on the surge element 119 can be transmitted through the longitudinal ribs 121 to the dip tube 107, so that the overall stability will be improved.

In addition, the longitudinal ribs 121 will improve the stability of the dip tube 107. The wall thickness of the dip tube 107 is for example between 2 mm and 3 mm.

The spacer ribs 115 project radially into the interior of the cylindrical dip tube 107 in the lower part of the dip tube 107 and serve to space the inserted filler nozzle from the vent opening 111 in the upper part of the dip tube 107, so that a vent channel is formed between the filler nozzle and the dip tube 107 in the area of the vent opening 111.

Figure 5:
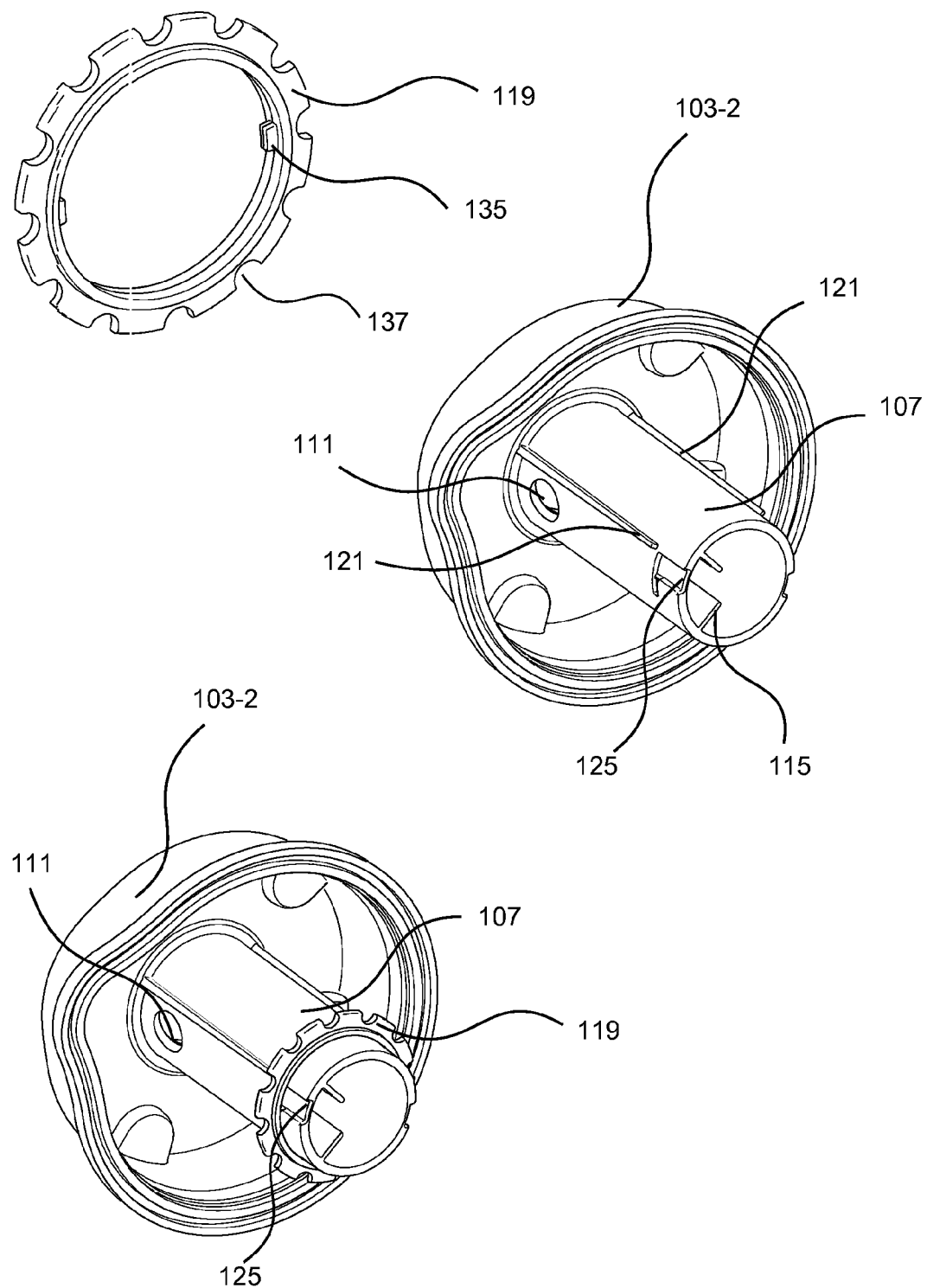
FIG. 5 shows an interior view of the filler head with a modularly attachable surge element.

FIG. 5 shows a modular surge element 119, an interior view of the upper molded housing part 103-2 of the filler head 100 and an interior view of the upper molded housing part 103-2 with installed surge element 119.

The modular surge element 119 is configured as an annular disk and extends between the outer side of the dip tube 107 and the inner side of the lower molded housing part 103-2. The surge element 119 prevents the filler head chamber 131 of the filler head 100 from being fully flooded by a return flow of liquid. The surge element 119 is for example a molded plastic part. The surge element 119 comprises semicircular surge apertures 137 in the form of openings allowing the liquid to pass partially into the filler head chamber 131. The surge apertures 137 are formed along the circumference of the annular disk.

On the inner side of the annular disk, two projecting bosses 135 are formed, which are inserted into the complementary openings 125 when the surge element 119 is being attached to the dip tube 107. The location and the position of the surge element 119 on the dip tube 107 can thus be defined precisely. In addition, forces acting on the surge element 119 will be transmitted via the bosses 135 to the dip tube 107.

The opening 125 is formed on the lower end of the dip tube 107 and allows the surge element 119 to be attached in the longitudinal direction. In addition, the opening 125 is formed thus that, after having been inserted in the opening 125, the surge element 119 can be fixed to the dip tube 107 by rotation. The opening 125 may be configured such that fixing of the surge element 119 to the dip tube 107 is accomplished after the fashion of a bayonet lock. Furthermore, the opening 125 may have provided therein a locking system, which prevents the surge element 119 from being released and which prevents the mounting position of the modular surge element 119.

The outer surface of the dip tube 107 has formed thereon longitudinal ribs 121, on which the surge element 119 rests in the mounted condition. The surge element 119 is thus additionally stabilized and supported in its position, so that a displacement of the surge element 119 in the interior of the filler head 100 can be prevented.

When the lower molded housing part 103-1 is connected to the upper molded housing part 103-2, the surge element 119 is additionally locked in position and stabilized via the fixing elements 123 provided in the lower molded housing part 103-1.

All the features explained and shown in connection with the individual embodiments of the present invention may be provided in different combinations in the subject matter according to the present invention so as to realize their advantageous effects simultaneously.

The scope of protection of the present invention is given by the claims and is not limited by the features explained in the description or shown in the figures.

LIST OF REFERENCE NUMERALS

100 filler head
103 housing
103-1 molded housing part
103-2 molded housing part
105 tank vent pipe
107 dip tube
109 filler opening
111 vent opening
113 spacer
115 spacer rib
117 stop
119 surge element
121 longitudinal rib
123 fixing element
125 opening
127 outlet
129 outlet connector
131 filler head chamber
133 surge wall
135 boss
137 surge aperture

What is claimed is:

1. A filler head for a liquid tank in a motor vehicle with a housing, comprising:
   a first molded housing part having formed therein a tank vent pipe for introducing air into the housing; and
   a second molded housing part having formed therein a dip tube for guiding a jet of liquid in the interior of the filler head, the dip tube including a vent opening for discharging from the filler head the air that may be introduced through the tank vent pipe, wherein the dip tube comprises a modular, annular surge element, which is attachable to the dip tube and configured to allow liquid to pass partially there through.

2. The filler head according to claim 1, wherein the vent opening of the dip tube is or comprises an opening of circular cross-section.

3. The filler head according to claim 1, wherein the vent opening of the dip tube is arranged in the area of an upper housing wall.

4. The filler head according to claim 1, wherein the dip tube is formed in the form of a cylinder.

5. The filler head according to claim 1, wherein the dip tube comprises on an inner side thereof a spacer for creating a vent channel in the area of the vent opening.

6. The filler head according to claim 5, wherein the spacer is formed by a spacer rib extending in the longitudinal direction of the dip tube.

7. The filler head according to claim 6, wherein the spacer rib includes a stop for a filler nozzle.

8. The filler head according to claim 7, wherein the stop in the spacer rib is arranged below the vent opening of the dip tube.

9. The filler head according to claim 1, wherein the tank vent pipe extends parallel to the dip tube.

10. The filler head according to claim 1, wherein the first molded housing part comprising a surge wall, which is arranged between an outlet of the tank vent pipe and the vent opening.

11. The filler head according to claim 1, wherein the modular, annular surge element is attached to the dip tube via an opening on an outer side of the dip tube.

12. The filler head according to claim 11, wherein the modular, annular surge element is fixed by a stop formed by longitudinal ribs positioned on the outer side of the dip tube.

13. The filler head according to claim 11, wherein the modular, annular surge element is fixed by at least one fixing element positioned on an inner side of the second molded housing part.

* * * * *